(12) United States Patent
Ballinger

(10) Patent No.: US 11,349,902 B2
(45) Date of Patent: *May 31, 2022

(54) SYSTEM AND METHOD TO STANDARDIZE AND IMPROVE IMPLEMENTATION EFFICIENCY OF USER INTERFACE CONTENT

(71) Applicant: Excentus Corporation, Dallas, TX (US)

(72) Inventor: Dana Ballinger, Flower Mound, TX (US)

(73) Assignee: Excentus Corporation, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/168,505

(22) Filed: Feb. 5, 2021

(65) Prior Publication Data

US 2021/0168192 A1  Jun. 3, 2021

Related U.S. Application Data

(63) Continuation of application No. 16/505,891, filed on Jul. 9, 2019, now Pat. No. 10,938,880.

(51) Int. Cl.
*G06F 15/16* (2006.01)
*H04L 67/02* (2022.01)
(Continued)

(52) U.S. Cl.
CPC .............. *H04L 67/02* (2013.01); *G06F 9/451* (2018.02); *G06F 16/252* (2019.01); *H04L 69/24* (2013.01)

(58) Field of Classification Search
CPC ......... H04L 67/02; H04L 67/12; H04L 67/30; H04L 67/2823; H04L 67/36; H04L 69/24;
(Continued)

(56) References Cited

U.S. PATENT DOCUMENTS

| 6,005,568 A | 12/1999 | Simonoff et al. |
| 7,596,620 B1 | 9/2009 | Colton et al. |

(Continued)

FOREIGN PATENT DOCUMENTS

| CN | 106570054 A | 4/2017 |
| WO | WO2017053961 A1 | 3/2017 |

OTHER PUBLICATIONS

Jiminez et al., A Web platform for the interactive visualization and analysis of the 3D fractal dimension of MRI data, Journal of Biomedical Informatics, 2014, pp. 176-190, 51, Elsevier Inc.
(Continued)

*Primary Examiner* — Ruolei Zong
(74) *Attorney, Agent, or Firm* — RegitzMauck PLLC

(57) ABSTRACT

A system and method to improve implementation efficiency of user interface content by using standard content attributes used across all platforms and devices to implement a lowest common denominator programming system. Standardized content attributes are used to produce a universal content framework that is implemented identically across various devices and platforms, resulting in a consistent and standardized user experience. The invention allows programming functionality to be universally applied and usable with any device and platform so that significant computer programming and updating inefficiencies are eliminated.

20 Claims, 7 Drawing Sheets

(51) Int. Cl.
*H04L 69/24* (2022.01)
*G06F 9/451* (2018.01)
*G06F 16/25* (2019.01)

(58) Field of Classification Search
CPC ... G06F 17/3056; G06F 17/3089; G06F 9/451
USPC .......................................................... 709/249
See application file for complete search history.

(56) References Cited

U.S. PATENT DOCUMENTS

| | | | |
|---|---|---|---|
| 8,332,815 B2 | 12/2012 | Balfe et al. | |
| 8,397,153 B1 | 3/2013 | Lee et al. | |
| 8,488,624 B2 | 7/2013 | Fries, IV et al. | |
| 8,799,799 B1 | 8/2014 | Cervelli et al. | |
| 9,021,035 B2 | 4/2015 | Auriemma et al. | |
| 9,037,964 B2 | 5/2015 | Appleyard et al. | |
| 9,396,038 B2 | 7/2016 | Allen et al. | |
| 9,442,906 B2 | 9/2016 | Greenberg et al. | |
| 9,461,817 B2 | 10/2016 | Moore et al. | |
| 9,471,711 B2 | 10/2016 | Abadi et al. | |
| 9,588,742 B2 | 3/2017 | Shakespeare et al. | |
| 9,639,631 B2 | 5/2017 | Williamson | |
| 9,678,726 B1 | 6/2017 | Massaguer et al. | |
| 9,705,815 B2 | 7/2017 | Mattson et al. | |
| 9,710,446 B2 | 7/2017 | Anwar | |
| 9,881,050 B2 * | 1/2018 | Chervirala | G06Q 30/0631 |
| 2009/0249290 A1 * | 10/2009 | Jenkins | G06F 9/451 717/109 |
| 2011/0208801 A1 * | 8/2011 | Thorkelsson | H04L 67/2814 709/203 |
| 2013/0232430 A1 | 9/2013 | Reitan | |
| 2013/0263112 A1 * | 10/2013 | Fernandez-Ruiz | G06F 9/50 717/178 |
| 2014/0096014 A1 | 4/2014 | Johnson et al. | |
| 2014/0122996 A1 | 5/2014 | Gupta et al. | |
| 2014/0222673 A1 | 8/2014 | Christophersen et al. | |
| 2014/0244766 A1 | 8/2014 | Mo et al. | |
| 2014/0250503 A1 * | 9/2014 | Woodard | H04L 63/10 726/5 |
| 2014/0310591 A1 | 10/2014 | Nguyen et al. | |
| 2015/0113429 A1 | 4/2015 | Edwards et al. | |
| 2015/0285398 A1 | 10/2015 | Govindan et al. | |
| 2015/0378994 A1 | 12/2015 | Kaplinger et al. | |
| 2016/0092036 A1 | 3/2016 | Rodgers et al. | |
| 2016/0092180 A1 | 3/2016 | Straub | |
| 2016/0092904 A1 | 3/2016 | Simons et al. | |
| 2016/0323690 A1 | 11/2016 | Daoud et al. | |
| 2016/0357711 A1 | 12/2016 | Zoon et al. | |
| 2016/0378792 A1 | 12/2016 | Rashid et al. | |
| 2017/0011012 A1 | 1/2017 | Das et al. | |
| 2017/0034306 A1 | 2/2017 | Thangeswaran | |
| 2017/0093652 A1 | 3/2017 | Blasko et al. | |
| 2017/0097922 A1 | 4/2017 | Kirtkow et al. | |
| 2018/0007099 A1 * | 1/2018 | Ein-Gil | G06F 9/468 |

OTHER PUBLICATIONS

Czaplicki et al., Asynchronous Functional Reactive Programming for GUIs,In Proceedings of the 34th ACM SIGPLAN Conference on Programming Language Design and Implementation—PLDI '13, Seattle, WA, Jun. 16-22, 2013, pp. 411-422, ACM Press, New York.
Charles Roberts, Control: Software for End-User Interface Programming and Interactive Performance, University of California at Santa Barbara, Media Arts and Technology Program, Jul. 31, 2011.
Frosini et al., User Interface Distribution in Multi-Device and Multi-User Environments with Dynamically Migrating Engines, In Proceedings of the ACM EICS '14, Rome, Italy, Jun. 17-20, 2014, pp. 55-64, ACM Press, New York.

* cited by examiner

SYSTEM AND METHOD TO STANDARDIZE AND IMPROVE IMPLEMENTATION EFFICIENCY OF USER INTERFACE CONTENT

The present application claims priority under 35 U.S.C. § 120 as a continuation of U.S. application Ser. No. 16/505,891, filed Jul. 9, 2019, which is a continuation of U.S. application Ser. No. 15/883,281, filed Jan. 30, 2018, now U.S. Pat. No. 10,397,304.

TECHNICAL FIELD

The present invention relates to a system and method that allows programming functionality to be universally applied and usable with any device and platform in such a way that the user interface and content are standardized and rendered faithfully across all target devices and platforms.

BACKGROUND OF THE INVENTION

The proliferation of computer platforms and devices upon which users can access computer programs, websites, or applications has frustrated programmers who must develop and write multiple versions of computer code so that content can be viewed and applications can operate in a standardized fashion on different platforms and different devices. The multiplicity of platforms and devices that are in operation represents a waste of time and effort necessary to tailor software to various platforms and devices in situations where the software must operate similarly regardless of the platform or device used. As independently developed programs are pushed down to the device level, subsequent software updates must also be developed and pushed down the device level each time a change or update of the program is necessary, which also requires that a separate change or update be created and implemented for each platform and device at issue.

New versions of platforms and devices also complicate the rendition of content and program operation to the extent that distinct code must be written to account for the changes or updates in platforms and devices as subsequent generations are released. The lack of interoperability across platforms and devices in the user interface realm is reminiscent of the early days of cell phones that resulted in a proliferation of non-backwards compatible phone chargers unique to each device and manufacturer. However, this waste of resources is measured not in hardware obsolescence, but rather in wasted human resources that could be better deployed if programs and updates could be created and implemented so that single programs could be developed that would function the same and display content the same across any platform or device employed by the user to access the program, website, or application.

As platforms or devices are upgraded, new software must be tailored to operate on the changed platforms or devices. Similarly, as the software programs or content changes, the new software must be tailored to operate on different platforms and devices. User interfaces, while appearing the same or similar regardless of the platform or devices, are actually separately programmed platform-dependent and device-dependent applications, and therefore, there is no process for designing a single user interface for every target device or platform that allows for any meaningful standardized display of content and functionality. Similarly, user interface elements cannot be associated with external content using a universal format that can be used across devices and platforms.

These interoperability issues have led to various problems beyond simply a waste of resources. The time, effort, and cost involved with tailoring software solutions to particular devices and platforms have led some companies to avoid certain devices or platforms, which has anticompetitive effects on the market for platforms and devices, as companies focus their efforts on only the most popular platforms and devices, while avoiding less popular platforms and devices altogether. This also had the effect of sacrificing optimum performance and device features, as well as hampering the available speed of implementation and time to market.

It would be beneficial if a solution were available that provided a reusable framework for current and future projects involving user interface (UI), user experience (UX), and content for many platforms, including mobile, desktop, and web applications. Such a solution would reduce time to market for both application creation and maintenance functions and would reduce costs associated with design, implementation, deployments, maintenance, and support. It would further provide uniformity, consistency, and reusability across all channels, including mobile, desktop and web. It would also conserve technical resources relating to developers, technical teams, software languages, specialized skills, hardware, software, frameworks, environments, and other infrastructure. Therefore, the reuse of existing infrastructure would be maximized.

BRIEF SUMMARY OF THE INVENTION

This invention is based on a unified, consistent, and standardized platform that can be used to manage and deliver content, UI, UX, client logic, and channels as well as a unified design methodology supported by standardized components for UI, UX, and content across all channels, client form-factors, and client versions. The invention allows UI, UX, and content to be designed and implemented without first developing back-end systems and data structures. Unlike applications that adapt content to the different characteristics of each distinct channel, embodiments of the present invention implement content attributes identically across various platforms and devices, which results in a consistent and standardized user experience. For example, the invention utilizes native mobile applications and views instead of HTML views in applications. Whereby web browsers are programs that interpret HTML, the invention provides programmers with the ability to package a collection of content elements into a single reusable component. Some embodiments of the invention use JSON (JavaScript Object Notation) as a lightweight data-interchange format to implement aspects of the invention in a language independent manner. In effect, through the use of common content elements that are used across platforms and devices, the invention provides the structure by which content elements that are common to all platforms and devices are used to produce consistent display characteristics and functionality. In this way, the need for custom software for each platform and each device is reduced as the invention takes advantage of common content elements to produce a consistent user experience. After the base programs are installed at the device level, payloads for dynamic content or updates only need be changed once regardless of the number of devices running any number of platforms. Payload content often consist of links, videos, images, or other third-party content that are generally not included in the universal content framework that is comprised of content attributes (e.g., text font in label) and related values (e.g., size of label in relation to UI).

The invention utilizes a lowest common denominator of universal native capabilities (e.g., shapes, images, lines, colors, text) to present content and functionality to users in a consistent manner regardless of the device or platform. The invention is based on the recognition that there are attributes and values used by all platforms that can be used to produce a universal UI, which can be responsively adapted to device size (e.g., the UI is able to resize itself to adjust to the current size of the available display area). The invention uses a universal set of attributes that applies to all content elements and components, across a wide variety of technological platforms and devices. JSON tags can also be used to refer to content components by reference, which provides the ability to use these user-defined components in a shorthand library, and once a change is made to a component stored in the library, the change is made in the payload application that can be downloaded to the spectrum of devices and platforms. Embodiments of the invention are not limited to implementations using JSON, but JSON is generally used in this specification as an exemplary data-interchange format. In these embodiments, JSON is used as a template for the UI that is structured to receive payload content, which in turn is incorporated within the JSON-defined universal template.

While many embodiments of the invention discussed focus on interactive content applications, the invention also applies to other UIs (reports, e-mail, text messages, etc.). Such a variety of applications are greatly beneficial from a marketing perspective where multiple platforms are often utilized to convey information to uses, customers, or potential customers.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
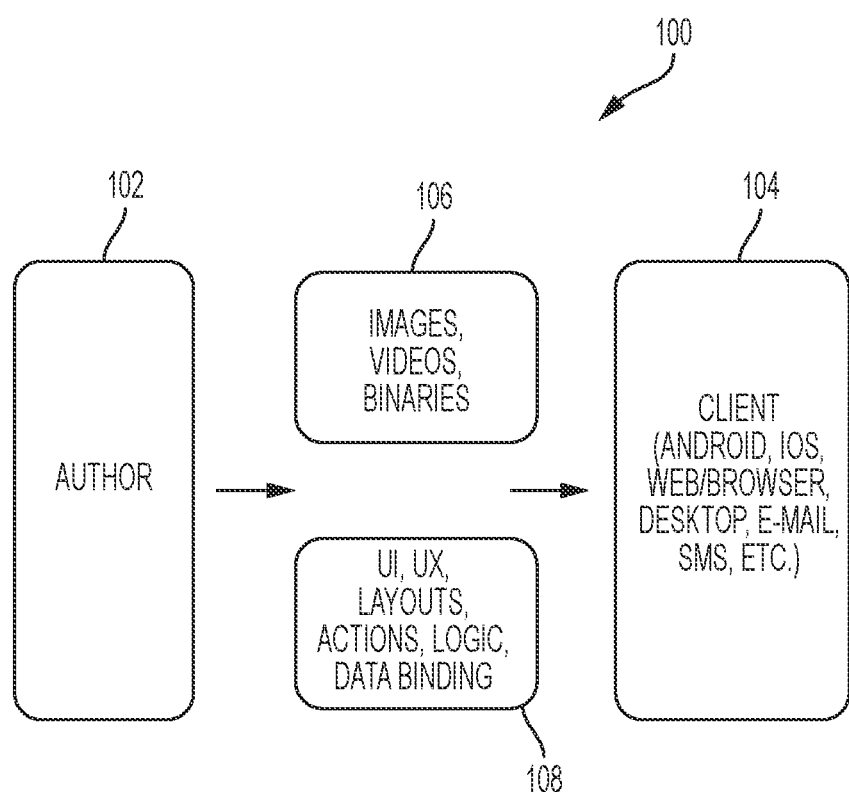
FIG. 1 is a diagram of an exemplary object hierarchy of content types used in embodiments of the invention.

FIG. 1 shows a simplified workflow summary that identifies elements that can be conceptualized as a JSON structured template and as part of the content delivery network. In this embodiment of the invention, Workflow 100 is broken down into component parts, beginning with server 102 and the author, which is the programmer/programming responsible for creating and sending to client 104 all of the content that the user will interact with on the user device. The content that flows from server 102 to client 104 is divided between content delivery network 106 (e.g., images, videos, binaries) and JSON structured template 108 (e.g., UI, UX, layouts, actions, data binding, logic). In this example, it is JSON structured template 108 that takes advantage of the universal set of attributes common across all platforms and devices to provide client 104 with the structure to receive the payload from content delivery network 106. In this way, JSON structured template 108 provides the universal structure designed to reside on dissimilar devices but to interface (UI and UX) with client 104 in a uniform manner and accept dynamic content in such a way that minimizes the size and scope of the payload necessary to uniformly interact with JSON structured template 108 that generally and relatively more permanently resides at client 104, which can utilize a variety of platforms (e.g., Android, iOS, web/browser, desktop, e-mail, SMS, printed reports) and which can be embodied in numerous devices such as Apple iPhones, personal computers, Samsung Galaxy phones, tablets, etc. For purposes of exemplary illustration, a server is used as the source of the program authorship, but it is expressly envisioned that distributed or cloud based network architectures can be used as the basis for implementing the invention.

In order to fully realize the advantages of the invention, a comprehensive unified content management system should be implemented to identify the elements that should be part of JSON structured template 108 and those that should be part of content delivery network 106. Unified content management generally comprises eight specific building blocks: Standardized Size-Aware Content, Reusable Content, Channel Adapters, Layout as Content, Data Binding as Content, Action Binding as Content, Centralized Content Repository, and Extensible Content API (Application Programming Interface).

Standardized Size-Aware Content allows the representation of content in a universal format suitable for any channel. Content is comprised of elements directly affecting the user experience such as text, images, video, audio, haptic feedback, colors, themes, styles, shapes, layouts, UIs, widgets, forms, data, etc. Content specifications can be defined at two levels: the components level (defining content in terms of reusable logical components, including their behavior and relationships) and JSON (defining JSON serialization or deserialization of components for persistent storage and transmission of components). Major content components are content containers (contain and organize other content), non-containers (independent components such as labels, buttons, and images), styles (collections of attributes that can be applied to one or more components), projects (stand-alone collections of components that can be used directly, or reused as components in other content or projects), and the Centralized Content Repository (an organized and persistent collection of stored content that is maintained by authors, and is available on-line for client software to present to users).

Figure 2:
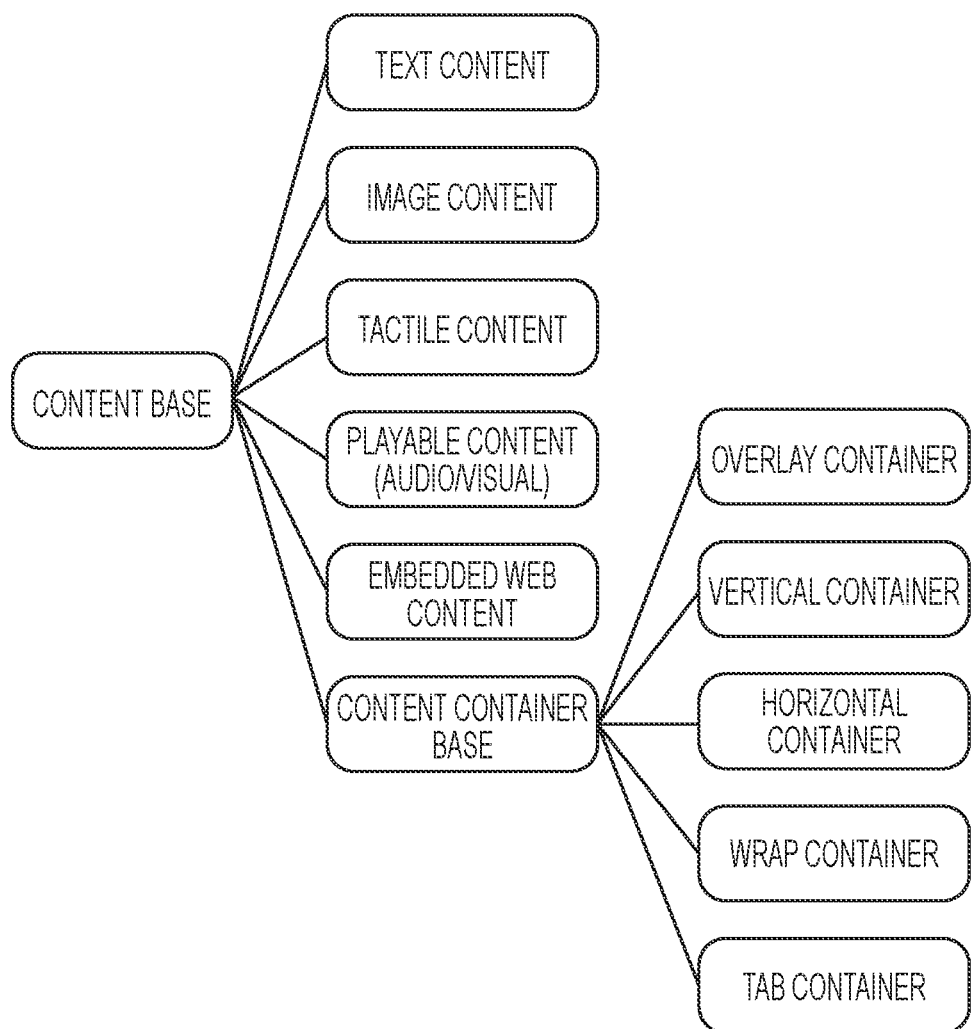
FIG. 2 is a diagram of an exemplary content delivery pipeline used in embodiments of the invention.

The size-aware aspect of Standardized Size-Aware Content allows content to adapt itself to any size device or screen, improving the user experience as well as significantly reducing implementation and maintenance efforts within and across channels. For example, HTML, the most widely adopted standard for content currently in existence, works for web and sometimes e-mail, but does not work particularly well for mobile or other channels. And even with the web applications, HTML can be difficult to implement, may not be size-aware, and may lead to inconsistencies across browsers, versions, and users. However, Standardized Size-Aware Content is capable of representing a piece of content independently from any specific channel or platform used to present the content to the user. This is accomplished by using a universal representation for all content by selecting common content types and attributes across all platforms and representing any piece of content or IU as a nested set of content elements using a single set of objects and attributes. Content is hierarchical in nature in that a given piece of content usually contains other content elements. For example, a page may contain a header and a body, and both the header and the body may contain both images and text. FIG. 2 shows an example of content structured as a hierarchy. In one embodiment of the invention, the JSON specification is sent to the client device so that it can receive the payload content and use the content to provide the user with a consistent UI experience regardless of the platform or device type. In this way, the structure of the UI is resident on the device and interprets and reflects content not identified as a common universal attribute contained in and comprising the UI structure.

Reusable Content allows a single piece of content to be reused as a sub-component in multiple places and/or across channels. This improves the user experience by improving UX and UI consistency for the user, which also significantly reduces implementation and maintenance efforts within and across channels.

Channel Adapters allow a single piece of content to be displayed and used appropriately across multiple channels, while still using the conventions of each target channel. A channel is a platform for delivery of content to users (e.g., Android, iOS, SMS, e-mail, web, print), each utilizing different technology and design standards. Each Channel Adapter is a separate, platform-specific software component. Most importantly, this software is the only platform-specific software used in conjunction with various embodiments of the invention. Channel Adapters allow channel-specific knowledge and human capital to be consolidated and decoupled from most other aspects of the content pipeline, including code, UI/UX design, creative design, testing, deployment, maintenance, support, and analytics. This reduces the propagation of channel-specific changes, ultimately reducing both effort and time-to-market.

Layouts as Content allow the relative positions of content to be defined from within the content, which eliminates the necessity of templates and the developers and other personnel otherwise needed to create and maintain the templates across multiple applications and multiple channels. This allows for entirely new user experiences, pages, and forms to be defined on-the-fly from content without the need for developers, which can improve time-to-market and reduce development costs.

Data Binding as Content allows content to contain the instructions for linking a user experience with data, which eliminates the necessity of developers to create specific software for each user experience, which providing more freedom to content designers and marketing teams. This also allows new data to be added to the system and integrated more rapidly into existing or new user experiences while minimizing or eliminating developer involvement, which leads to a corresponding reduction in effort and costs and an improved time-to-market.

Action Binding as Content allows content to contain the instructions for what happens when a user interacts with the content, which eliminates the need for developers to create specific software for each possible user action while allowing content designers and marketing teams to control the user experience. This also results in reduced effort and costs and an improved time-to-market.

Centralized Content Repository allows content to be accessible and reusable across multiple devices, multiple systems, and multiple channels. The removal of built-in-content from channel endpoints such as applications and web pages results in fewer versions of content and faster deployment of new or modified content, reduced costs, and improved time-to-market.

Extensible Content API allows content clients such as mobile applications and websites to access and use the content so that content and content-related services can be published to third-party clients, powering their white-label versions of the applications.

Figure 3:
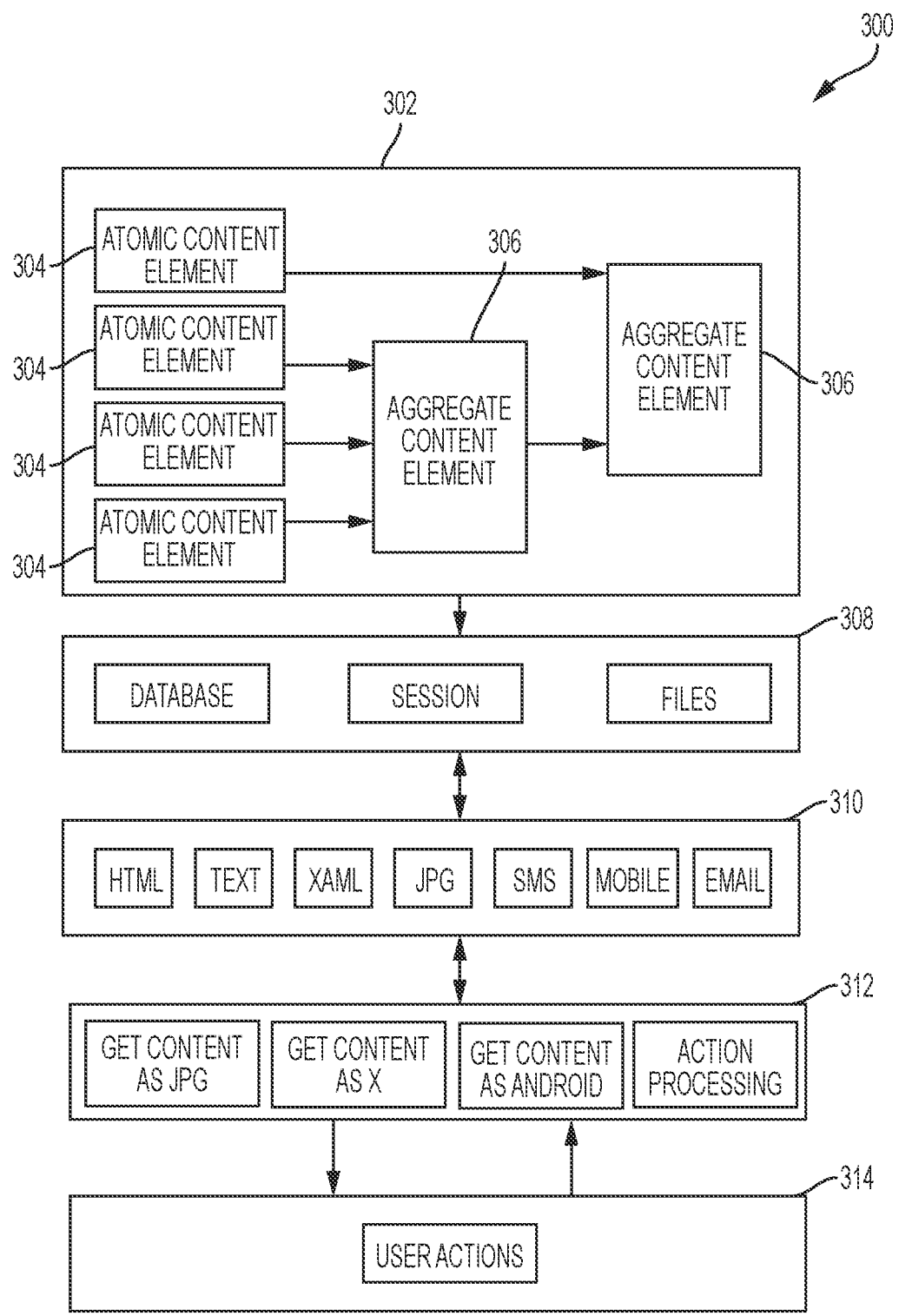
FIG. 3 shows a simplified workflow summary of an embodiment of the invention.

An exemplary content delivery pipeline 300 is shown in FIG. 3. Centralized Content Repository 302 is at the topmost level of the content delivery pipeline 300 and is used to store both atomic content elements 304 and aggregate content elements 306. Atomic content elements are those elements that represent the lowest level of detail, or alternatively stated, atomic content elements are those elements that can no longer be broken down into smaller elements. Atomic content comprises basic content elements built into the system and are the starting point for all other content. Atomic content can be divided into two major categories: containers (content used to organize child content elements) and non-containers (content building blocks such as labels, images, button, input text, etc.). Containers are used to organize a group of content elements. Any type of content can be placed into a container, including other containers, which allows content to be nested. Nesting enhances content reusability because any container has the potential to become an independent reusable component that can be accessed by multiple content projects.

A label is a non-editable block of text. Examples may include titles, links, information, and general text. Binding can be used to associate labels with data. Although labels can be links, it is usually preferable to use a button for this function to provide the user with an unambiguous indication that an action will occur when the button is actuated. Buttons allow the user to take a specific action and can include linking. Input text is an editable block of text and examples may include forms, data entry, and lists of selectable items. Optional features that can be used with input text are text wrapping, auto-complete, and validation. Binding can also be used to associate images with an image file, and scaling can be used to set the scaling mode of the image.

Aggregate content elements are comprised of two or more atomic content elements. Previously created content elements may be reused by one or more aggregation elements, thereby allowing construction of increasingly elaborate aggregations/content elements.

At the next level of content delivery pipeline 300 is data binding stage 308. At data binding stage 308, content sent from Centralized Content Repository 302 is combined with data from various sources. At rendering stage 310, each content element is transformed into a target format such as HTML, JPG, PNG, XAML, text, Android Layout, or iOS NIB. In this embodiment, rendering refers to the process of transforming a JSON definition of content into a form suitable for presentation to a user on the target level device or platform (channel). This transformation process is similar to the compilation of source code into an executable. As with code, this process is largely characterized by a series of dereferencing steps.

In a preferred embodiment, rendering stage 310 comprises six sub-stages: Pre-rendering (Raw Content), Pre-rendering (Content Dereferencing), Pre-rendering (Data Dereferencing), Pre-rendering (Session Dereferencing), Rendering (Channel), and Rendering (Context). Raw Content in the form of (normalized) JSON and/or other prefigured binaries (e.g., images) may be delivered directly to the client or to the next stage (i.e., Content Dereferencing). At the Pre-rendering (Content Dereferencing) sub-stage, pre-rendered JSON content is dereferenced (denormalized) using other JSON content, and is stored back into Centralized Content Repository 302. At the Pre-rendering (Data Dereferencing) sub-stage, pre-rendered content is dereferenced using persistent system data (files, records, etc.) and/or tables that are not session-dependent. At the Pre-rendering (Session Dereferencing) sub-stage, pre-rendered content is dereferenced using session data. At the Rendering (Channel) sub-stage, content is dereferenced and/or rendered as channel-specific components/objects. At the Rendering (Context) sub-stage, content is dereferenced and/or rendered based upon the current context, which typically involves states in the active view at the client, and is the point at which the content is actively interacting with the user in real time and is fully rendered.

Depending upon concerns based upon channel, security, and UX requirements, implementation of some sub-stages may exist at either the client or at the host. Even though rendering stage location is variable, content is still defined at the host at the Pre-rendering (Raw Content) sub-stage. In other words, the rendering pipeline implementation does not change the ability to control content centrally. Source JSON content can reference other content so that content can be reused, both within the same channel and across multiple channels. For example, a single image stored in the repository may appear on Android, iOS, and web, but content referencing is not limited to images and content in the form of a project or a named JSON fragment may similarly be referenced and used as well.

At Extensible Content API stage 312, the final content is delivered to its destination. The user interacts with the final delivered content a stage 314, and the user's interaction with the content is processed locally or remotely via the API.

Embodiments of the invention generally implement a UI that is adaptive to size of the user interface. The invention takes advantage of universal native capabilities and common attributes used across programs, applications, browsers, cellphones, etc. This universal set of attributes, once selected, applies to all components (e.g., buttons, containers). Base attributes focus on UI appearance (e.g., lines, labels, colors, text). Binding attributes focus on the integration of external data (e.g., linking data to UI elements). Action attributes focus on the action that occurs when the user actuates a function by interacting with the UI (e.g., user actuates a push button on his cell phone). The hierarchical structure that is used in embodiments of the invention provides for the nesting of data, which allows for further nesting of data within the UI. The UI structure is sent to the user device along with other content being displayed. Data components can be referred to by reference (e.g., JSON tags), which can be defined components contained in a library or repository, so that a change made once in a content repository will be implemented across every platform and device in the payload content cross-referenced to the library or repository or any other source of content.

Figure 4:
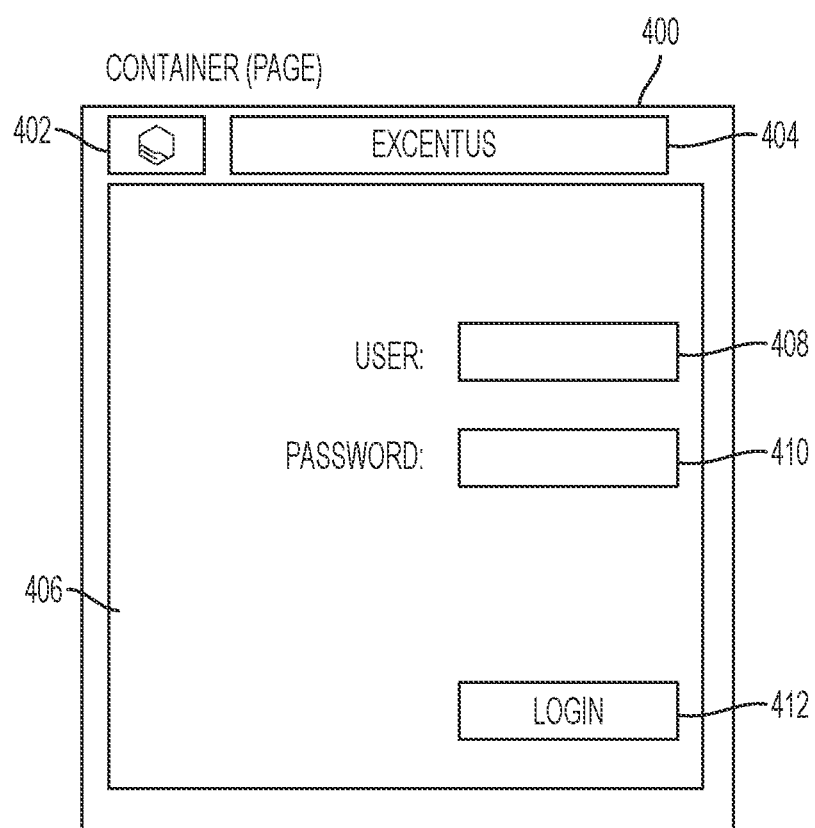
FIG. 4 shows an exemplary UI structure with various content elements in an embodiment of the invention.

FIG. 4 shows an exemplary UI structure with various content elements. Container 400 represents a universal rendering of the interface a user experiences regardless of platform or device. This example shows a common login webpage or initial application view. At the top of the page is logo 402 and title 404. Logo 402 is a non-editable image and title 404 is non-editable text. Similarly, login-container 406 includes non-editable aspects that is also considered part of the structure in this example, which along with the colors, layout, logo 402, and title 404 will generally comprise the structure that will be universally defined across platforms and devices in this example. The non-editable elements include labels "USER" and "PASSWORD" text. However, log-in container 406 also contains editable text user id field 408 and password field 410 as input text. Optional features such as auto-complete can be programmed into the input text functionality.

Once user has completed the necessary fields to login, the user actuates login button 412, which will usually be programmed with action binding functionality to process the validation function that confirms or rejects the user id and/or password entered into the UI. FIG. 4 represents a simple example of how the invention utilizes common elements (e.g., labels, text, colors) that are used across all platforms and devices to develop a universal structure designed to receive dynamic payload content and perform dynamic functionality in a manner that does not necessitate the development of a new UI package, for each and every platform and device, every time a change is made or a version is updated. Only the dynamic or non-standardized content need be updated, and that can be accomplished using shorthand tools that pull content from other sources or content repositories. A change at the content source (e.g., database with value binding to text, link to third-party data stream) will automatically update the dynamic content displayed at the UI.

Figure 5:
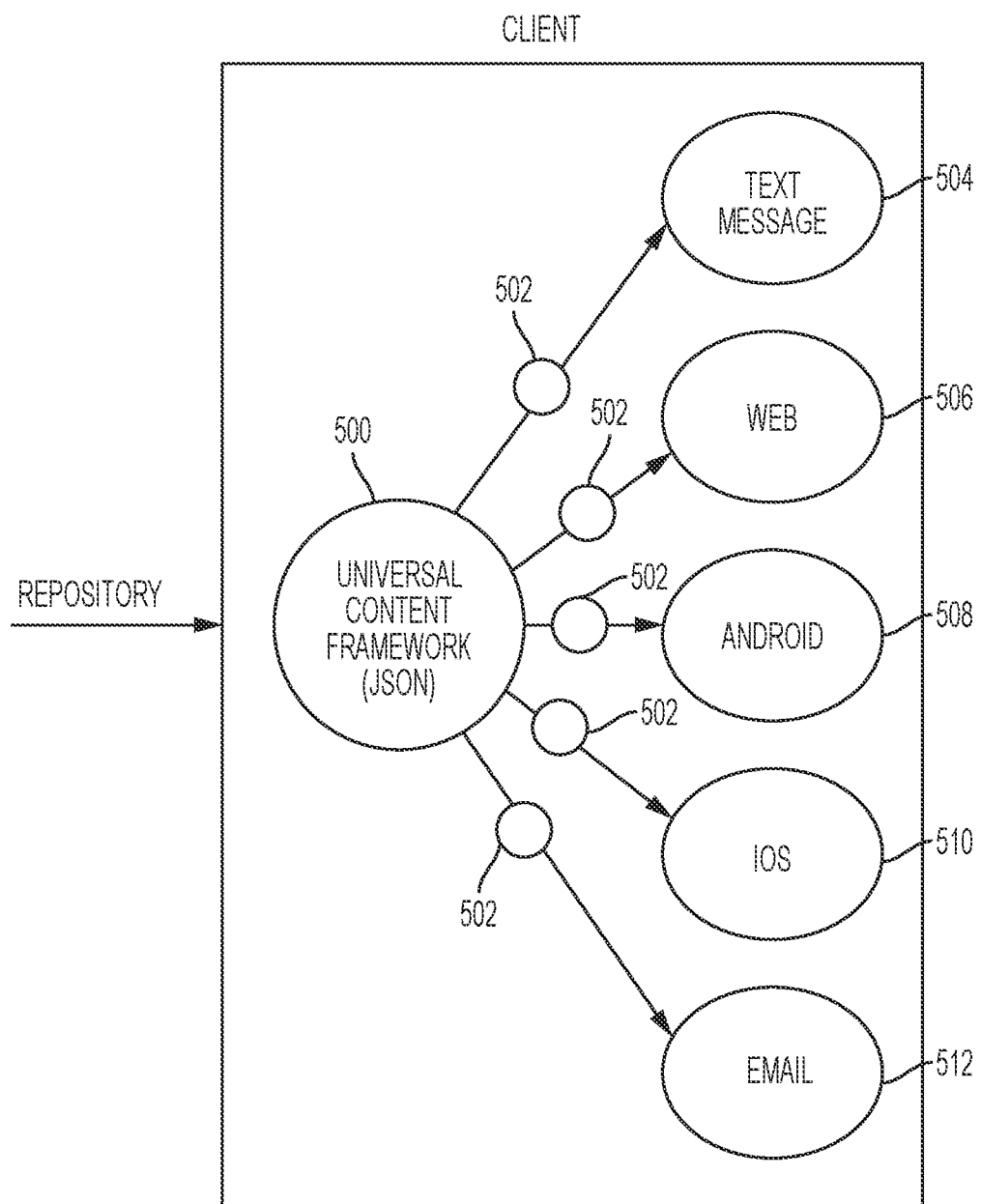
FIG. 5 exemplifies client-side functionality in an embodiment of the invention.

FIG. 5 shows a client-side representation of an embodiment of the invention and shows universal content framework 500 interacting with several types of platforms that can be used for coordinated marketing efforts. In this example, universal content framework 500 has been created using JSON. Rendering code 502 takes the JSON and converts it into a universal "look at feel" across all platforms by translating the JSON into platform-specific structure that has been created using common attributes. In this way, the invention can be used to create UIs in the form of text messages 504, websites 506, Android-based devices 508, iOS-based devices 510, and e-mail 512. For example, should a marketing department want to send out information to its customers using all of these forms of communication, it can simply create a single content payload designed to fit within the universal content framework and send it out. The framework and payload content (whether dynamic or static) will be rendered the same to the client regardless of the platform or end user interface or device.

Figure 6:
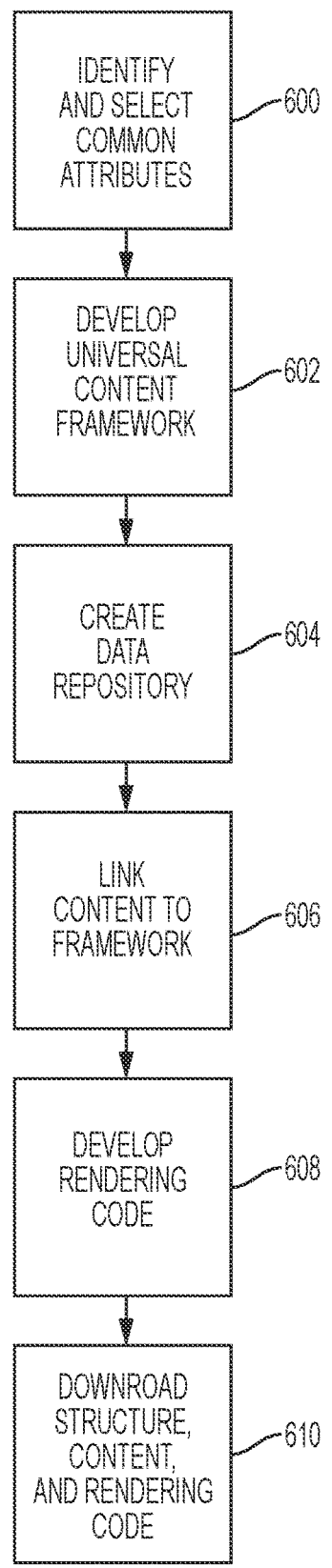
FIG. 6 is a sequential flowchart setting forth the process of implementing an embodiment of the invention.

FIG. 6 is a sequential flowchart setting forth the process of implementing an embodiment of the invention. At step 600, common attributes are identified and selected. At step 602, the universal content framework that will be used to provide the common structure is developed. At step 604, a corresponding content repository is created to be used in conjunction with the universal content framework. At step 606, relationships are made (e.g., using JSON) between dynamic attributes residing in the content repository or elsewhere and their eventual location and functionality within the universal content framework. At step 608, client-specific rendering code is developed to provide for common UI experience regardless of platform or user device. At step 610, universal content framework, attributes residing in the content repository or elsewhere, and client-specific rendering code is downloaded to the user at the platform and device level.

Figure 7:
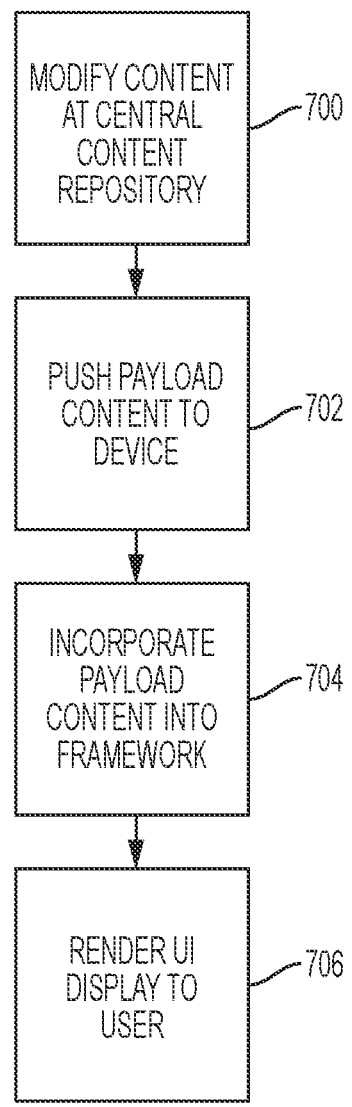
FIG. 7 is a sequential flowchart setting forth the process of modifying and downloading payload content to be utilized within the universal content framework in an embodiment of the invention.

FIG. 7 is a sequential flowchart setting forth the process of modifying and downloading payload content to be utilized within the universal content framework in an embodiment of the invention. At step 700, content used at the device level is modified at a centralized content repository or another source used in relation to the UI or its functionality. At step 702, that content (e.g., image, video, binaries) is pushed down to the device level or is downloaded as a result of a request or refresh of the UI. At step 704, the content is incorporated into the universal content framework based on the defined attributes (e.g., base attributes, binding attributes, action attributes). At step 706, the UI is rendered to the user based on the platform being used.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for presenting user interface content across computing platforms and computing devices comprising:
    a hardware processor for selecting standardized content based on its universal usage across distinct computing platforms and distinct computing devices and creating a unified framework using said standardized content;
    a memory connected to said hardware processor;
    a content repository for storing said standardized content; and
    a user interface comprising said standardized content wherein said standardized content in said content repository is linked to said unified framework and wherein said user interface resides on user access devices, at least two of said user access devices having distinct operating systems and wherein said user interface is configured such that said standardized content is bound to one or more underlying data sources.

2. The system for presenting user interface content across computing platforms and computing devices of claim 1 wherein said content repository comprises atomic content attributes and aggregate content attributes.

3. The system of presenting user interface content across computing platforms and computing devices of claim 1 further comprising a dynamic content payload incorporated into said user interface.

4. The system of presenting user interface content across computing platforms and computing devices of claim 3 wherein said dynamic content payload is transmitted to said user access devices in one or more transmission formats.

5. The system of presenting user interface content across computing platforms and computing devices of claim 1 wherein said user interface utilizes containers to organize said standardized content.

6. The system of presenting user interface content across computing platforms and computing devices of claim 1 wherein said standardized content in said content repository is linked to said unified framework by identifying said standardized content using tags.

7. The system of presenting user interface content across computing platforms and computing devices of claim 6 wherein said tags are incorporated into said user interface and access said standardized content stored in said content repository based on a cross-referenced tag identification.

8. A method for presenting user interface content across computing platforms and computing devices comprising the steps of:
    selecting standardized content based on its universal usage across computing platforms and computing devices;
    creating a unified framework using said standardized content, said standardized content stored in a content repository;
    rendering said unified framework into one or more user interface formats; and
    binding said standardized content to one or more underlying data sources.

9. The method for presenting user interface content across computing platforms and computing devices of claim 8 wherein said unified framework comprises one or more action binding references to respond to user interaction.

10. The method for presenting user interface content across computing platforms and computing devices of claim 8 further comprising the step of evaluating standardized content based on its universal usage across computing platforms and computing devices.

11. The method for presenting user interface content across computing platforms and computing devices of claim 8 further comprising the step of developing said content repository comprising both atomic content attributes and aggregate content attributes.

12. The method for presenting user interface content across computing platforms and computing devices of claim 8 further comprising the step of transmitting said unified framework to user devices.

13. The method for presenting user interface content across computing platforms and computing devices of claim 8 further comprising the step of organizing said standardized content into one or more containers.

14. The method for presenting user interface content across computing platforms and computing devices of claim 13 wherein said one or more containers contain atomic content attributes and aggregate content attributes.

15. The method for presenting user interface content across computing platforms and computing devices of claim 8 wherein said step of creating said unified framework using said standardized content comprises cross-referencing said standardized content with tags incorporated into said unified framework.

16. A non-transitory computer readable medium with computer executable instructions stored thereon executed by a processor to perform a method for presenting user interface content across computing platforms and computing devices comprising the steps of:
  evaluating standardized content based on its universal usage across computing platforms and computing devices;
  selecting standardized content based on its universal usage across computing platforms and computing devices;
  creating a unified framework using selected standardized content; and
  rendering unified framework into one or more user interface formats.

17. The non-transitory computer readable medium with computer executable instructions stored thereon executed by a processor to perform the method for presenting user interface content across computing platforms and computing devices of claim 16 further comprising binding said standardized content to one or more underlying data sources.

18. The non-transitory computer readable medium with computer executable instructions stored thereon executed by a processor to perform the method for presenting user interface content across computing platforms and computing devices of claim 16 further comprising the step of modifying said standardized content.

19. The non-transitory computer readable medium with computer executable instructions stored thereon executed by a processor to perform the method for presenting user interface content across computing platforms and computing devices of claim 16 further comprising the step of pushing a dynamic content payload to user access devices.

20. The non-transitory computer readable medium with computer executable instructions stored thereon executed by a processor to perform the method for presenting user interface content across computing platforms and computing devices of claim 19 wherein said dynamic content payload is rendered into said one or more user interface formats and incorporated into said unified framework.

* * * * *